United States Patent [19]

Frost et al.

[11] Patent Number: 5,160,631
[45] Date of Patent: Nov. 3, 1992

[54] METHOD FOR TREATING CHELANT SOLUTIONS TO REMOVE METALS IN SOLUTION

[75] Inventors: Jack G. Frost; Kenneth J. Snyder, both of Duncan, Okla.

[73] Assignee: Halliburton Company, Duncan, Okla.

[21] Appl. No.: 740,544

[22] Filed: Aug. 5, 1991

[51] Int. Cl.$^5$ .............................. C02F 1/62; C02F 1/64
[52] U.S. Cl. ..................... 210/720; 210/724; 210/726; 210/727; 210/912; 210/913; 423/55; 423/37; 423/140
[58] Field of Search ............... 210/665, 667, 668, 912, 210/913, 724, 734, 721, 722, 723, 727, 729, 726; 423/55, 56, 37, 140, 143

[56] References Cited

U.S. PATENT DOCUMENTS

| | | |
|---|---|---|
| 3,308,065 | 3/1967 | Lesinski . |
| 3,413,160 | 11/1968 | Teumac . |
| 3,438,811 | 4/1969 | Harriman et al. . |
| 4,172,784 | 10/1979 | Knorre et al. ................ 210/722 |
| 4,172,785 | 10/1979 | Knorre et al. ................ 210/722 |
| 4,419,246 | 12/1983 | Jayawant .................... 210/912 |
| 4,629,570 | 12/1986 | Kennedy, Jr. . |
| 4,705,639 | 11/1987 | Aldrich ...................... 210/913 |
| 4,971,775 | 11/1990 | Hoy et al. ................... 210/702 |

*Primary Examiner*—Stanley S. Silverman
*Assistant Examiner*—Neil M. McCarthy
*Attorney, Agent, or Firm*—Robert A. Kent

[57] ABSTRACT

A process for removing at least a portion of any iron, copper, nickel and chromium ions that are chelated by a alkylenepolyamine polyacetic acid or salt in an aqueous liquid waste. The process comprises the steps of (a) adjusting the pH of the liquid to above about 10; (b) adding sufficient sodium sulfide to react with at least a portion of the copper ions; (c) separating precipitated iron and copper compounds; (d) adding nitric acid to adjust the pH to the range of about 6 to 8; (e) adding sufficient sodium nitrite to the liquid to react with at least a portion of the nickel and chromium present; (f) heating the liquid to above about 575° F. for at least about 15 minutes to facilitate precipitation of nickel and chromium; and (g) separating precipitated solids to leave a non-hazardous filtrate.

18 Claims, No Drawings

METHOD FOR TREATING CHELANT SOLUTIONS TO REMOVE METALS IN SOLUTION

BACKGROUND OF THE INVENTION

1. Field Of The Invention

The present invention relates to a method for treating an aqueous liquid containing dissolved metals chelated by an alkylenepolyamine polyacetic acid. More particularly, the present invention relates to the treatment of certain liquid waste solutions to remove dissolved heavy metals therefrom.

2. Description Of The Prior Art

The alkylenepolyamine polyacetic acid chelants form a known class of compounds having many members. The most common of these are ethylenediaminetetraacetic acid (EDTA) and diethylenetriaminepentaacetic acid (DEPA); and of these, (EDTA) is by far the most widely used compound on a commercial scale. Because the materials are relatively insoluble in the acid form, such compounds are normally used as their soluble salts. The alkali metal (e.g. sodium) salts and the ammoniated salts are the best known.

There are many chelant uses for the alkylenepolyamine polyacetic acids, but one such utility is in cleaning iron oxide containing scale from steam generating equipment. In almost any type of metal equipment in which water is evaporated or heat transfer occurs, insoluble salts deposit upon the surface to form a scale. The composition of the scale will vary depending upon the water which has been used, the type of equipment, the operating temperature and the like. The scale may be very dense or coarse, tightly bound to the base metal or not. In most stream generating units, the scale usually consists of oxides of iron, which include magnetite together with red iron oxide. When the steam generating unit is fabricated using parts containing copper or copper alloys, as for example, in the condenser units, the scale will normally also contain copper and/or copper oxide(s).

The scale also may contain small quantities of "heavy" metals such as nickel, zinc, chromium, lead and the like.

Several investigators have addressed the problem of scale removal. Lesinski described in U.S. Pat. No. 3,308,065 a unique way of removing iron oxide containing scale from ferrous metal surfaces and for passivating the clean surface. Lesinski discovered that ammoniated salts of alkylenepolyamine polycarboxylic acids were particularly efficient in scale removal when used at an alkaline pH (generally above about pH of 8). Ammoniated EDTA used at a pH of from about 8 to about 11, preferably about 9, was said to be a preferred solvent.

Harriman et al. in U.S. Pat. No. 3,438,811 discovered that an aqueous solution of a ferric chelate of an alkylenepolyamine polycarboxylic acid at an alkaline pH was unusually effective in removing copper-containing encrustations or elemental copper from ferrous metal surfaces.

Teumac (U.S. Pat. No. 3,413,160) then described a method of passivating ferrous metal surfaces which has been cleaned using an alkylenepolyamine polycarboxylic acid at an alkaline pH to remove iron-oxide containing scale and/or copper encrustations from steam generating equipment. In this process, an oxidizing agent was added at the end of the cleaning process and the oxidation potential of the aqueous solution was carefully monitored to achieve the desired degree of passivation.

The technology described by Lesinski, Harriman, and Teumac represent the state of the art. All use alkylenepolyamine polycarboxylic acids or salts thereof at an alkaline pH and all generate waste solutions which contain dissolved iron as an iron chelate and other metals with the alkylenepolyamine polyacetic acids or salts.

Waste disposal is a significant problem in today's industrial environment. Thus, the problem of how to safely deal with a liquid waste containing dissolved complexes of iron and/or copper and other heavy metals with alkylenepolyamine polyacetic acid chelants is a question that must be faced after each cleaning job. It has been demonstrated that the liquid waste can be safely and efficiently incinerated, but with increasingly stringent controls on incineration, this is becoming less acceptable in many states. Thus, there exists a strong and increasing need for a safe and efficient method for removing heavy metals from such aqueous liquids prior to disposal.

One solution to the problem is described in Kennedy, Jr. (U.S. Pat. No. 4,629,570) which is capable of removing over 99.9 percent of the dissolved iron and copper present in the waste by a sequential treatment. The pH is first adjusted to at least 12.5, sufficient quantities of a soluble calcium salt are added to facilitate growth of insoluble iron hydroxide and an alkali metal N,N-dimethyl or N,N-diethyldithiocarbamate is added to the waste to remove a significant portion of any copper and any other heavy metals present. The remaining solution, however, may be considered a hazardous waste under current EPA regulations.

It would be desirable to provide a method of removing other heavy metals from the waste whereby the material may be rendered non-hazardous in accordance with current EPA regulations.

SUMMARY OF THE INVENTION

A process now has been discovered for removing iron, copper, nickel, zinc, chromium, lead and other metals from liquid waste solution, such as those referred to as "chemical metal cleaning wastes," containing alkylenepolyamine polyacetic acid and/or soluble salts of such acid. The process comprises the steps of: (a) adjusting the pH of the liquid to above about 10 by the addition of sodium, potassium or calcium hydroxide; (b) adding sufficient sodium sulfide to react with at least a portion of any soluble copper in the liquid; (c) separating precipitated iron and copper from the liquid; (d) adding sufficient nitric acid to said liquid to adjust the pH to a range of about 6 to 8; (e) adding sufficient sodium nitrite to the liquid to react with at least a portion of any soluble chromium or nickel present; and (f) heating the liquid to a temperature above about 575° F. for at least about 30 minutes to facilitate the formation of a precipitate of at least a portion of any chromium or nickel present as well as a portion of any lead, zinc or other heavy metals that may be present.

The novel process is highly effective in reducing the amount of dissolved iron, copper, nickel, chromium, lead, zinc and other metals that may be present in solution and yields an effluent that is not considered to be a hazardous waste as defined in 40 CFR 261.

DETAILED DESCRIPTION OF THE INVENTION

The general class of alkylenepolyamine polyacetic acids and their salts used as chelants are well known as indicated in U.S. Pat. Nos. 3,308,065, 3,438,811, 3,413,160 and 4,629,570 which are incorporated herein by reference. The types of metals that are chelated are likewise well known. The various metals include iron, copper, nickel, lead, chromium, zinc and the like. The instant process is highly effective in removing dissolved metals from the chelating liquids.

In the first step, the chemical metal cleaning waste comprising an aqueous solution of an alkylenepolyamine polyacetic acid and/or its salts, such as EDTA, having chelated heavy metals therein is adjusted to a pH above about 10. Preferably, the pH is adjusted to a range of from about 11.5 to about 12.5, however, it is to be understood that it may be adjusted to a higher pH. The pH adjustment is effected by the addition of an alkali metal or alkaline earth oxide or hydroxide to the aqueous solution. Typically, sodium or potassium hydroxide could be used, however, it is preferred that calcium hydroxide be used to facilitate precipitation of iron from the solution. If the pH is adjusted with a compound other than calcium, it is preferred that sufficient quantity of a soluble calcium salt be added to the solution to facilitate formation of an iron hydroxide precipitate in the solution. In this instance, amounts of from about 0.25 to about 5 weight percent are generally sufficient to induce precipitation of the iron hydroxide.

The solution then is admixed with a sufficient quantity of sodium or potassium or calcium sulfide to facilitate precipitation of copper and at least a portion of any lead or zinc that may be present. The sulfide salt preferably is added to the solution in an amount slightly in excess of the stoichiometric amounts required to react with the copper and other heavy metals present. Generally, an amount of from about 0.5 to 1.5 grams per liter excess sulfide based on the copper content is sufficient. Preferably, the solution is allowed to sit for a period of from about 12 to about 24 hours during which solids continue to condense and precipitate. It is to be understood that the solution could be permitted to sit for longer periods, however, such longer periods are unnecessary for satisfactory performance of the method of the present invention.

The solution may, if desired, include a flocculation aid to facilitate precipitation of the various solids since the particle size of many of the particles will be less than about 1 micron. The flocculation additive may be substantially any of the known compounds that are suitable for such use. One example of such a compound would be an anionic, water soluble polymer such as polyacrylamide which could be added in an amount of from about 2 to 10 ppm.

To facilitate handling of the solution, the solution may be filtered to remove precipitated solids. This may be an active process or a passive process. For example, filtration may be accomplished by the use of high pressure filtration techniques, centrifugation techniques, settling ponds, or the like.

The particular method will depend upon the equipment that is available to the artisan. The precipitated solids will include iron hydroxide, copper sulfide and at least a portion of any zinc or lead that may be present in the form of a sulfide.

In one embodiment of the invention, if sodium or potassium salts were utilized rather than calcium salts to adjust the pH, alkylenepolyamine polyacetic acid may be recovered for re-use as a salt by addition of acid to the filtrate solution. For example, adjustment of the pH to about 1.8 or below will cause EDTA to precipitate from the solution. The precipitate then may be filtered to recover the acid salt.

In a more preferred embodiment, the filtrate is admixed with sufficient nitric acid to adjust the pH of the filtrate to a level in the range of from about 6 to about 8 and preferably to about 7. The filtrate also is admixed with sufficient sodium nitrite to react with at least a portion of the EDTA present to induce precipitation of at least a portion of any nickel, chromium or other heavy metals that may be present. Preferably, the sodium nitrite is admixed with the filtrate in an amount of at least about 1.1 grams per gram of alkylenepolyamine polyacetic acid present in the filtrate.

The solution containing sodium nitrite then is heated to a temperature above about 575° F. for a period of at least about 15 minutes. Preferably, the solution is heated to a temperature in the range of from about 580° F. to about 600° F. for a period of from about 30 to about 60 minutes. The particular reaction time will depend upon the quantity of sodium nitrite utilized in the filtrate. The determination of the optimum quantity may be readily accomplished by simple tests performed by the artisan. It is to be understood that the solution may be heated to higher temperatures and that longer reaction times may be utilized, however, such conditions are not required for the most economical treatment of the solution. The heat treatment results in at least partial breakdown of any alkylenepolyamine polyacetic acid present and the consequent precipitation of at least a portion of any chromium, nickel and iron still present in the solution. At least a portion of any other metals, such as, for example, copper, lead or zinc, if present, also would precipitate. The solution preferably is cooled after the heating by heat exchange with incoming solution to recover at least a portion of the heat energy to reduce the expense of the treatment. The heat exchange equipment can comprise substantially any device that is suitable for such purpose that is known to the artisan. The treated solution then can be filtered by any of the methods previously described to separate the particulate solids that have precipitated. The filtrate can be disposed of by introduction into a sewer. The solution being considered non-hazardous after treatment in that the metals present in solution have been substantially removed by the treatment. The precipitated solids may be disposed of in a conventional landfill since the precipitates are generally considered to be stable salts that would not be subject to leaching or other movement in the soil.

To further illustrate the present invention, but not by way of limitation, the following examples are provided.

EXAMPLE 1

A quantity of a chemical metal cleaning waste comprising ammoniated EDTA was obtained from an electric power generation facility after treatment of a boiler system. The solution had the following analysis.

| EDTA | 3.7% by weight |
|---|---|
| metals | mg./lit. |
| Fe | 4900 |
| Cu | 530 |

| EDTA | 3.7% by weight |
|---|---|
| metals | mg./lit. |
| Ni | 750 |
| Zn | 100 |
| Cr | 10 |
| Pb | 7 |

A quantity of the solution was admixed with sufficient calcium hydroxide to adjust the pH of the solution to about 10.5 and sodium sulfide was added in an amount of 3 ml/100 ml. of solution. The solution was allowed to sit overnight and then was filtered through a 45 micron filter. The pH was about 11.7 after sitting overnight. The filtrate then was divided into samples and admixed with varying quantities of nitric acid and sodium nitrite in an amount of 6 g/100 ml of solution. The solution then was heated to 600° F. for 1 hour. The pH of the solution samples is set forth in Table I together with the metals analysis.

| Sample No. | Initial pH | Fe | Cu | Ni | Zn | Cr | Pb |
|---|---|---|---|---|---|---|---|
| | | | | mg/l | | | |
| 1 | 9.0 | <1 | <1 | 10.6 | 0 | 0 | 0.3 |
| 2 | 8.1 | <1 | <1 | 13 | 0 | 0 | 0.3 |
| 3 | 7.0 | <1 | <1 | 0.6 | 0 | 0 | 0.1 |
| 4 | 6.9 | <1 | <1 | 0.3 | 0 | 0 | 0.2 |
| 5 | 6.0 | <1 | <1 | 0.8 | 0 | 0 | 0.2 |
| 6 | 5.0 | <1 | <1 | 170 | 0 | 0 | 0.1 |

To illustrate the effect of time on metal precipitation samples of the same solution were adjusted to a pH of about 7 with nitric acid, quantities of sodium nitrite set forth below and heated to about 600° F. for the times set forth below in Table 4.

| Sample No. | Time, Minutes | NaNO$_2$ g/100 ml | Ni | Zn |
|---|---|---|---|---|
| | | | mg/l | |
| 16 | 60 | 6.0 | 0.3 | 0 |
| 17 | 30 | 6.0 | 0.5 | 0 |
| 18 | 15 | 6.0 | 122 | 0 |
| 19 | 60 | 4.2 | 0.2 | 0 |
| 20 | 30 | 4.2 | 107 | 0 |

The foregoing data clearly demonstrates the ability of the process of the present invention to remove dissolved metals from a chemical metal cleaning waste and produce products that may be disposed of in an environmental acceptable manner and which are not considered hazardous waste.

While preferred embodiments of the invention have been described herein, changes or modifications can be made in the method by an individual skilled in the art without departing from the spirit or scope of the invention as set forth in the appended claims.

What is claimed is:

1. A process for removing dissolved metal ions including iron, copper, nickel and chromium from an aqueous liquid containing such metal ions in the form of a soluble chelate with an alkylenepolyamine polyacetic acid or its salts, said process comprising the steps of:
   adjusting the pH of said aqueous liquid to a pH in excess of about 10.0 to induce precipitation of iron ions present;
   adding sufficient sodium sulfide to react with any copper ions and to initiate precipitation of at least a portion of any copper ions present;
   separating at least a portion of any precipitated iron and copper compounds from said aqueous liquid;
   adding sufficient nitric acid to said aqueous liquid to adjust the pH to a level in the range of about 6 to 8;
   adding sufficient sodium nitrite to said aqueous liquid to facilitate precipitration of nickel and chromium ions;
   heating said aqueous liquid containing said nitric acid and sodium nitrite to a temperature above about 575° F. to effect at least partial breakdown of said polyacetic acid and thereby precipitate at least a portion of any chromium and nickel ions present; and
   separating at least a portion of any precipitated chromium and nickel compounds from said aqueous liquid.

2. The process of claim 1 wherein the pH is adjusted to above about 11.5 to induce precipitation of iron that is present.

3. The process of claim 1 wherein the pH is adjusted to a level in the range of from about 11.5 to about 12.5 to induce precipitation of iron.

4. The process of claim 1 wherein the pH is adjusted by the addition of calcium hydroxide.

5. The process of claim 1 wherein the sodium sulfide is admixed with the aqueous liquid in an amount of from about 0.5 to about 1.5 grams per liter of solution in excess of the stoichiometric amount required to react with the copper ions present.

6. The process of claim 1 wherein a flocculation aid is added to the aqueous liquid to facilitate removal of precipitated solids.

7. The process of claim 1 wherein the nitric acid is added in an amount sufficient to adjust the pH of the aqueous liquid to about 7.

8. The process of claim 1 wherein the sodium nitrite is added in an amount of at least 1.1 grams per gram of alkylenepolyamine polyacetic acid or salt present in the aqueous liquid.

9. The process of claim 1 wherein the aqueous liquid is heated to a temperature in the range of from about 580° F. to about 600° F.

10. The process of claim 1 wherein the aqueous liquid is heated to above about 575° F. for at least about 15 minutes.

11. A waste treatment process for removing iron, copper, nickel and chromium ions from an aqueous liquid waste in which said ions exist as soluble chelates with ethylenediaminetetraacetic acid (EDTA) and/or a soluble chelating salt of EDTA, said process comprising the steps of:
   adjusting the pH of said aqueous liquid to a pH in excess of about 10 with calcium hydroxide;
   adding sufficient sodium sulfide to said aqueous liquid to react with any copper ions present;
   forming a precipitate of at least a portion of said iron and copper ions that are present;
   adding sufficient nitric acid to said filtrate to adjust the pH to a level in the range of from about 6 to about 8;
   adding sufficient sodium nitrite to said filtrate to subsequently facilitate precipitation of at least a portion of said nickel and chromium ions;
   heating said filtrate containing said nitric acid and sodium nitrite to a temperature level above about 575° F. for a sufficient time to effect at least partial breakdown of said polyacetic acid and thereby effect precipitation of at least a portion of said nickel and chromium ions; and separating at least a portion of said precipitated nickel and chromium ions from said filtrate to produce a liquid effluent.

12. The process of claim 11 defined further to include the steps of admixing a flocculation aid with said aqueous liquid to facilitate separation of precipitated solids.

13. The process of claim 11 wherein the pH of the filtrate is adjusted to about 7.

14. The process of claim 11 wherein said filtrate is heated to a temperature in the range of from about 580° F. to about 600° F.

15. The process of claim 11 wherein said sodium sulfide is admixed with said aqueous liquid in an amount of from about 0.5 to 1.5 grams per liter of aqueous liquid in excess of the stoichiometric amount required to react with said copper ions present in said liquid.

16. The process of claim 11 wherein said sodium nitrite is added to said filtrate in an amount in excess of about 1.1 grams per percent of EDTA or its chelating salt present in the aqueous liquid.

17. The process of claim 11 wherein said filtrate is heated to a temperature in the range of from about 580° F. to about 600° F. for a period of from about 30 to about 60 minutes.

18. The process of claim 11 wherein said precipitate is separated from said aqueous liquid after permitting said aqueous liquid to sit for about 12 hours to permit said precipitate to condense from said aqueous liquid.

* * * * *